(12) United States Patent
Ishizeki et al.

(10) Patent No.: US 11,203,251 B2
(45) Date of Patent: Dec. 21, 2021

(54) VEHICLE AIR CONDITIONING DEVICE

(71) Applicant: SANDEN AUTOMOTIVE CLIMATE SYSTEMS CORPORATION, Isesaki (JP)

(72) Inventors: Tetsuya Ishizeki, Isesaki (JP); Kohei Yamashita, Isesaki (JP); Ryo Miyakoshi, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 124 days.

(21) Appl. No.: 16/084,677

(22) PCT Filed: Apr. 5, 2017

(86) PCT No.: PCT/JP2017/014887
§ 371 (c)(1),
(2) Date: Sep. 13, 2018

(87) PCT Pub. No.: WO2017/179594
PCT Pub. Date: Oct. 19, 2017

(65) Prior Publication Data
US 2019/0070933 A1    Mar. 7, 2019

(30) Foreign Application Priority Data
Apr. 14, 2016    (JP) .............................. JP2016-081242

(51) Int. Cl.
*B60H 1/00*     (2006.01)
*B60H 1/22*     (2006.01)
(Continued)

(52) U.S. Cl.
CPC ............. *B60H 1/2225* (2013.01); *B60H 1/22* (2013.01); *B60H 1/32* (2013.01); *B60H 1/3213* (2013.01);
(Continued)

(58) Field of Classification Search
CPC .... B60H 1/2225; B60H 1/3201; B60H 1/005; B60H 1/3215; F25B 39/04
See application file for complete search history.

(56) References Cited

U.S. PATENT DOCUMENTS

2003/0159455 A1    8/2003    Aikawa et al.
2004/0129012 A1    7/2004    Feuerecker
(Continued)

FOREIGN PATENT DOCUMENTS

CN    1952528    4/2007
CN    103786547    5/2014
(Continued)

OTHER PUBLICATIONS

Atsuo, Air Conditioner for Vehicle, 1996, Full Document (Year: 1996).*
(Continued)

*Primary Examiner* — Elizabeth J Martin
*Assistant Examiner* — Nael N Babaa
(74) *Attorney, Agent, or Firm* — Cozen O'Connor

(57) ABSTRACT

There is disclosed a vehicle air conditioning device which inhibits generation of noise in a solenoid valve 30 disposed on an inlet side of a radiator 4 and improves durability of the solenoid valve. A second operation mode is executed to shut off an outdoor expansion valve 6, close the solenoid valve 30, open a solenoid valve 40 and thereby send a refrigerant discharged from a compressor 2 through a bypass pipe 35 to an outdoor heat exchanger 7. When a first operation mode to open the solenoid valve 30 and close the solenoid valve 40 and thereby send the refrigerant to the radiator 4 is shifted to the second operation mode, a controller opens the solenoid valve 30 at a timing to stop the compressor 2.

6 Claims, 6 Drawing Sheets

(51) Int. Cl.
  *F25B 1/00* (2006.01)
  *B60H 1/32* (2006.01)
  *F24F 110/12* (2018.01)
  *F25B 39/04* (2006.01)
(52) U.S. Cl.
  CPC .............. *F25B 1/00* (2013.01); *B60H 1/3202* (2013.01); *F24F 2110/12* (2018.01); *F25B 39/04* (2013.01)

(56) References Cited

U.S. PATENT DOCUMENTS

| | | | | |
|---|---|---|---|---|
| 2015/0298525 | A1* | 10/2015 | Miyakoshi | F25B 40/00 62/160 |
| 2016/0082810 | A1* | 3/2016 | Suzuki | B60H 1/00921 62/151 |
| 2017/0074204 | A1* | 3/2017 | Takamiya | F02D 13/0246 |
| 2019/0070929 | A1* | 3/2019 | Nakamura | B60H 1/32 |

FOREIGN PATENT DOCUMENTS

| | | | |
|---|---|---|---|
| EP | 2727754 | 5/2014 | |
| JP | H08282262 A | * 10/1996 | .............. B60H 1/00 |
| JP | 2001-260645 | 9/2001 | |
| JP | 2002-106978 | 4/2002 | |
| JP | 2004-216934 | 8/2004 | |
| JP | 2005-514253 | 5/2005 | |
| JP | 2013-23210 | 2/2013 | |
| JP | 2013-522116 | 6/2013 | |
| JP | 2016049837 A | * 4/2016 | ............ B60W 20/14 |

OTHER PUBLICATIONS

Office Action dated Jan. 22, 2021 issued in Chinese Patent Application No. 201780018150.7.

* cited by examiner

VEHICLE AIR CONDITIONING DEVICE

TECHNICAL FIELD

The present invention relates to an air conditioning device of a heat pump system which conditions air of a vehicle interior, and more particularly, it relates to an air conditioning device which is applicable to a hybrid car and an electric vehicle.

BACKGROUND ART

To cope with enhancement of environmental problems in recent years, hybrid cars and electric vehicles have spread. Furthermore, as an air conditioning device which is applicable to such a vehicle, there has been developed a device including a compressor to compress and discharge a refrigerant, an internal condenser disposed on the side of a vehicle interior to let the refrigerant radiate heat, an evaporator disposed on the side of the vehicle interior to let the refrigerant absorb heat, an external condenser disposed outside the vehicle interior to let the refrigerant radiate or absorb heat, a first expansion valve to expand the refrigerant flowing into this external condenser, a second expansion valve to expand the refrigerant flowing into the evaporator, a pipe which bypasses the internal condenser and the first expansion valve, and a first valve to switch so that the refrigerant discharged from the compressor flows through the internal condenser or so that the refrigerant bypasses this internal condenser and the first expansion valve to directly flow from the pipe to the external condenser, and there are changed and executed a heating mode to send the refrigerant discharged from the compressor to the internal condenser through the first valve, thereby let the refrigerant radiate heat, decompress the refrigerant from which the heat has been radiated through the first expansion valve and then let the refrigerant absorb heat in the external condenser, a dehumidifying mode to let the refrigerant discharged from the compressor radiate heat in the internal condenser through the first valve, decompress the refrigerant from which the heat has been radiated through the second expansion valve and then let the refrigerant absorb heat in the evaporator, and a cooling mode to send, to the external condenser, the refrigerant discharged from the compressor and bypassing the internal condenser and the first expansion valve through the first valve, let the refrigerant radiate heat in the external condenser, decompress the refrigerant through the second expansion valve and then let the refrigerant absorb heat in the evaporator (e.g., see Patent Document 1).

CITATION LIST

Patent Documents

Patent Document 1: Japanese Patent Application Publication No. 2013-23210

SUMMARY OF THE INVENTION

Problems to be Solved by the Invention

As described above, in Patent Document 1, there is a situation where a refrigerant does not flow through an internal condenser (corresponding to a radiator in the present application) when a mode changes to a cooling mode. That is, an outlet of a first valve on the side of the internal condenser is closed. This closing results in a state where the refrigerant is confined within a closed circuit including an internal condenser (107) and extending from a first valve (117) to a first expansion valve (119). Therefore, when a compressor is stopped immediately after the mode is changed to the cooling mode, a pressure on the side of the internal condenser might be higher than a pressure on a discharge side of the compressor.

Here, when a flow channel is changed with two opening/closing valves, i.e., the opening/closing valve (a first opening/closing valve in this application) on the side of the internal condenser (the radiator in the present application) and the opening/closing valve (a second opening/closing valve) on the side of an external condenser (an outdoor heat exchanger in the present application) in place of the first valve that is a three-way valve, the pressure on the internal condenser side (a radiator side) becomes higher than the pressure on the discharge side of the compressor (a compressor in the present application) during the stop thereof, and a reverse pressure may be then applied to the opening/closing valve (the first opening/closing valve in the present application) on the internal condenser side, thereby causing hunting. Furthermore, when the hunting occurs in the opening/closing valves, there are problems that noise is generated in the opening/closing valves and that their durability deteriorates.

The present invention has been developed to solve such conventional technical problems, and an object thereof is to provide a vehicle air conditioning device which is capable of inhibiting generation of noise in a first opening/closing valve disposed on an inlet side of a radiator and improving durability of the opening/closing valve.

Means for Solving the Problems

A vehicle air conditioning device of the invention of claim 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in the bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber, and the vehicle air conditioning device is characterized in that after the first operation mode is shifted to the second operation mode, the control device opens the first opening/closing valve at a timing to stop the compressor.

The vehicle air conditioning device of the invention of claim 2 is characterized in that in the above invention, the number of times to open the first opening/closing valve by the control device is limited.

A vehicle air conditioning device of the invention of claim 3 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in the bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber, and the vehicle air conditioning device is characterized in that when shifting from the first operation mode to the second operation mode, the control device stops the compressor prior to execution of control to each of the closing of the first opening/closing valve, the opening of the second opening/closing valve and the shutoff of the outdoor expansion valve, then closes the first opening/closing valve, opens the second opening/closing valve, shuts off the outdoor expansion valve, and then starts the compressor.

A vehicle air conditioning device of the invention of claim 4 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in the bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber, and the vehicle air conditioning device is characterized in that in the second operation mode, the control device monitors a difference in pressure between an inlet side of the first opening/closing valve and an outlet side thereof, and opens the first opening/closing valve when the pressure on the outlet side of the first opening/closing valve is higher than the pressure on the inlet side thereof.

The vehicle air conditioning device of the invention of claim 5 is characterized in that each of the above inventions includes an auxiliary heating device to heat the air to be supplied from the air flow passage to the vehicle interior, the first operation mode includes any one, any combination or all of a heating mode to let the refrigerant discharged from the compressor radiate heat in the radiator, decompress the refrigerant from which the heat has been radiated, through the outdoor expansion valve, and then let the refrigerant absorb heat in the outdoor heat exchanger, a dehumidifying and cooling mode to send the refrigerant discharged from the compressor through the radiator to the outdoor heat exchanger, let the refrigerant radiate heat in the radiator and the outdoor heat exchanger, decompress the refrigerant from which the heat has been radiated, and then let the refrigerant absorb heat in the heat absorber, and a cooling mode to send the refrigerant discharged from the compressor through the radiator to the outdoor heat exchanger, let the refrigerant radiate heat in the outdoor heat exchanger, decompress the refrigerant from which the heat has been radiated, and then let the refrigerant absorb heat in the heat absorber, and the second operation mode includes either one or all of a dehumidifying and heating mode to send the refrigerant discharged from the compressor through the bypass pipe to the outdoor heat exchanger, let the refrigerant radiate heat, decompress the refrigerant from which the heat has been radiated, let the refrigerant absorb heat in the heat absorber, and generate heat in the auxiliary heating device, and a maximum cooling mode to send the refrigerant discharged from the compressor through the bypass pipe to the outdoor heat exchanger, let the refrigerant radiate heat, decompress the refrigerant from which the heat has been radiated, and then let the refrigerant absorb heat in the heat absorber.

The vehicle air conditioning device of the invention of claim 6 is characterized in that in the above invention, the first operation mode is the heating mode or the dehumidifying and cooling mode, and the second operation mode is the dehumidifying and heating mode.

Advantageous Effect of the Invention

According to the invention of claim 1, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in this bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber. In the vehicle air conditioning device, after the first operation mode is shifted to the second operation mode, the control device opens the first opening/closing valve at a timing to stop the compressor. Consequently, after the mode is shifted to the second operation mode to close the first opening/closing valve and open the second opening/closing valve and the compressor is then stopped, it is possible to eliminate the disadvantage that a reverse pressure is applied to the first opening/closing valve. In consequence, it is possible to previously eliminate or inhibit the disadvantage that hunting occurs in the first opening/closing valve to generate noise or the problem that durability of the first opening/closing valve deteriorates.

In this case, when the number of times to open the first opening/closing valve by the control device is limited as in the invention of claim 2, it is possible to previously avoid unnecessary opening/closing of the first opening/closing valve.

According to the invention of claim 3, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in this bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber. In the vehicle air conditioning device, when shifting from the first operation mode to the second operation mode, the control device stops the compressor prior to execution of control to each of the closing of the first opening/closing valve, the opening of the second opening/closing valve and the shutoff of the outdoor expansion valve, then closes the first opening/closing valve, opens the second opening/closing valve, shuts off the outdoor expansion valve, and then starts the compressor. Consequently, when the first opening/closing valve is closed and the outdoor expansion valve is shut off, the compressor is stopped, and a pressure in a circuit including the radiator and extending from the first opening/closing valve to the outdoor expansion valve can be lowered. In consequence, when the mode is shifted to the second operation mode to close the first opening/closing valve and open the second opening/closing valve, it is possible to eliminate or inhibit the disadvantage that a reverse pressure is applied to the first opening/closing valve, and it is possible to previously eliminate or inhibit the disadvantage that hunting occurs in the first opening/closing valve to generate noise or the problem that durability of the first opening/closing valve deteriorates.

According to the invention of claim 4, a vehicle air conditioning device includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior, an outdoor expansion valve to decompress the refrigerant flowing out from the radiator and flowing into the outdoor heat exchanger, a first opening/closing valve disposed between a discharge side of the compressor and an inlet side of the radiator, a bypass pipe which branches on an upstream side of this first opening/closing valve and bypasses the radiator and the outdoor expansion valve to send, to the outdoor heat exchanger, the refrigerant discharged from the compressor, a second opening/closing valve disposed in this bypass pipe, and a control device, so that this control device switches between and executes a first operation mode to open the first opening/closing valve, close the second opening/closing valve, thereby send the refrigerant discharged from the compressor to the radiator, and send the refrigerant flowing out from this radiator through the outdoor expansion valve to the outdoor heat exchanger, and a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from this outdoor heat exchanger to the heat absorber. In the vehicle air conditioning device, in the second operation mode, the control device monitors a difference in pressure between an inlet side of the first opening/closing valve and an outlet side thereof, and opens the first opening/closing valve when the pressure on the outlet side of this first opening/closing valve is higher than the pressure on the inlet side thereof. Therefore, when the mode is shifted to the second operation mode to close the first opening/closing valve and open the second opening/closing valve, it is possible to rapidly eliminate a situation where a reverse pressure is applied to the first opening/closing valve. Consequently, it is possible to inhibit or previously eliminate the disadvantage that hunting occurs in the first opening/closing valve to generate noise or the problem that durability of the first opening/closing valve deteriorates.

Here, as in the invention of claim 5, the vehicle air conditioning device includes an auxiliary heating device to heat the air to be supplied from the air flow passage to the vehicle interior, the first operation mode includes any one, any combination or all of a heating mode to let the refrigerant discharged from the compressor radiate heat in the radiator, decompress the refrigerant from which the heat has been radiated, through the outdoor expansion valve, and then let the refrigerant absorb heat in the outdoor heat exchanger, a dehumidifying and cooling mode to send the refrigerant discharged from the compressor through the radiator to the outdoor heat exchanger, let the refrigerant radiate heat in the radiator and the outdoor heat exchanger, decompress the refrigerant from which the heat has been radiated, and then let the refrigerant absorb heat in the heat absorber, and a cooling mode to send the refrigerant discharged from the compressor through the radiator to the outdoor heat exchanger, let the refrigerant radiate heat in the outdoor heat exchanger, decompress the refrigerant from which the heat has been radiated, and then let the refrigerant absorb heat in the heat absorber, and the second operation mode includes either one or all of a dehumidifying and heating mode to send the refrigerant discharged from the compressor through the bypass pipe to the outdoor heat exchanger, let the refrigerant radiate heat, decompress the refrigerant from which the heat has been radiated, let the refrigerant absorb heat in the heat absorber, and generate heat in the auxiliary heating device, and a maximum cooling mode to send the refrigerant discharged from the compressor through the bypass pipe to the outdoor heat exchanger, let the refrigerant radiate heat, decompress the refrigerant from which the heat has been radiated, and then let the refrigerant absorb heat in the heat absorber. At this time, as in the invention of claim 6, the first operation mode is the heating mode or the dehumidifying and cooling mode, and the second operation mode is the dehumidifying and heating mode. Consequently, in the dehumidifying and heating mode often shifted from the heating mode or the dehumidifying and cooling mode, the heat is generated in the auxiliary heating device after the shift, and hence evaporation of the refrigerant in the radiator is promoted.

In consequence, when the mode is shifted to the dehumidifying and heating mode, the refrigerant rapidly flows out from the radiator while the first opening/closing valve or the outdoor expansion valve is opened as in the above respective inventions. Consequently, it is possible to decrease a level of the reverse pressure applied to the first opening/closing valve.

MODE FOR CARRYING OUT THE INVENTION

Hereinafter, description will be made as to embodiments of the present invention in detail with reference to the drawings.

Figure 1:
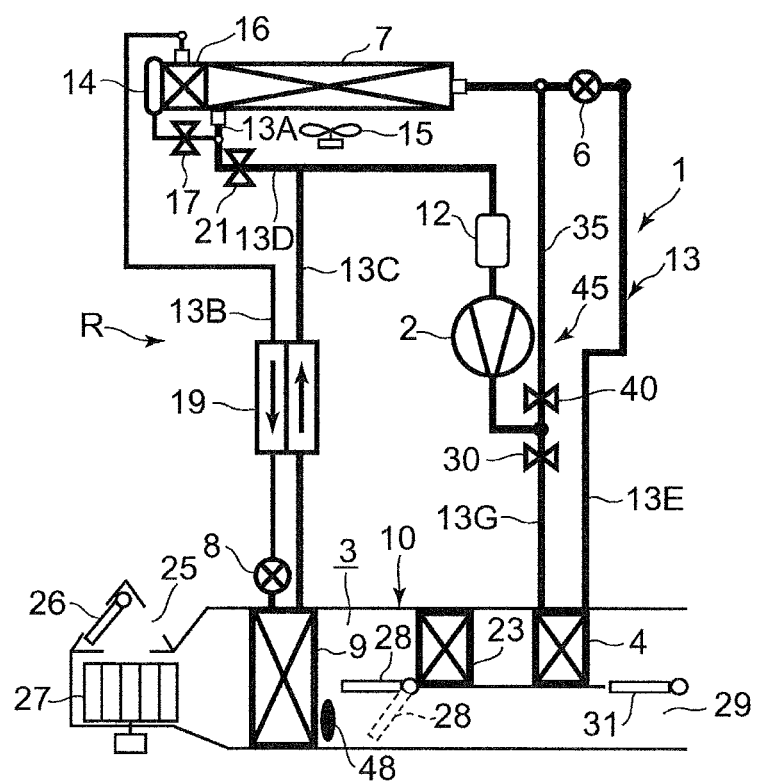
FIG. 1 is a constitutional view of a vehicle air conditioning device of an embodiment to which the present invention is applied (a heating mode, a dehumidifying and heating mode, a dehumidifying and cooling mode, and a cooling mode)

FIG. 1 shows a constitutional view of a vehicle air conditioning device 1 of one embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicle air conditioning device 1 of the present invention is also driven by the power of the battery. Specifically, in the electric vehicle which is not capable of performing heating by engine waste heat, the vehicle air conditioning device 1 of the embodiment performs a heating mode by a heat pump operation in which a refrigerant circuit is used, and furthermore, the conditioning device selectively executes respective operation modes of a dehumidifying and heating mode, a dehumidifying and cooling mode, a cooling mode, and a MAX cooling mode (the maximum cooling mode).

It is to be noted that the vehicle is not limited to the electric vehicle, and the present invention is also effective for a so-called hybrid car in which the engine is used together with the electric motor for running. Furthermore, needless to say, the present invention is also applicable to a normal car which runs with the engine. Additionally, the above heating mode, the dehumidifying and cooling mode and the cooling mode are included in a first operation mode of the present invention, and the dehumidifying and heating mode and the MAX cooling mode are included in a second operation mode of the present invention.

The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to send inside the high-temperature high-pressure refrigerant discharged from the compressor 2 via a refrigerant pipe 13G and let this refrigerant radiate heat in the vehicle interior, an outdoor expansion valve 6 constituted of an electric valve which decompresses and expands the refrigerant during the heating, an outdoor heat exchanger 7 which is disposed outside the vehicle interior and performs heat exchange between the refrigerant and outdoor air to function as the radiator during the cooling and to function as an evaporator during the heating, an indoor expansion valve 8 constituted of an electric valve to decompress and expand the refrigerant, a heat absorber 9 disposed in the air flow passage 3 to let the refrigerant absorb heat from interior and exterior of the vehicle during the cooling and during the dehumidifying, an accumulator 12, and others, thereby constituting a refrigerant circuit R.

Furthermore, this refrigerant circuit R is charged with a predetermined amount of refrigerant and a predetermined amount of lubricating oil. It is to be noted that an outdoor blower 15 is provided in the outdoor heat exchanger 7. The outdoor blower 15 forcibly sends the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity is 0 km/h).

Additionally, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 to be opened during the cooling, and a refrigerant pipe 13B on an outlet side of the subcooling portion 16 is connected to an inlet side of the heat absorber 9 via the indoor expansion valve 8. It is to be noted that the receiver drier portion 14 and the subcooling portion 16 structurally constitute a part of the outdoor heat exchanger 7.

In addition, the refrigerant pipe 13B between the subcooling portion 16 and the indoor expansion valve 8 is disposed in a heat exchange relation with a refrigerant pipe 13C on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

Furthermore, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12, and the accumulator 12 is connected to a refrigerant suction side of the compressor 2. Additionally, a refrigerant pipe 13E on an outlet side of the radiator 4 is connected to an inlet side of the outdoor heat exchanger 7 via the outdoor expansion valve 6.

In addition, a solenoid valve 30 (a first opening/closing valve in the present application, which is the solenoid valve for reheating) to be closed during the dehumidifying and heating and MAX cooling described later is disposed in the refrigerant pipe 13G between a discharge side of the compressor 2 and an inlet side of the radiator 4. In this case, the refrigerant pipe 13G branches to a bypass pipe 35 on an upstream side of the solenoid valve 30, and in this bypass pipe 35, there is provided a solenoid valve 40 (a second opening/closing valve in the present application, which is the solenoid valve for bypass) to be opened during the dehumidifying and heating and MAX cooling. The bypass pipe communicates and connects with the refrigerant pipe 13E on a downstream side of the outdoor expansion valve 6 via this solenoid valve 40. The bypass pipe 35, the solenoid valve 30 and the solenoid valve 40 constitute a bypass device 45.

Thus, the bypass pipe 35, the solenoid valve 30 and the solenoid valve 40 constitute the bypass device 45, so that it is possible to smoothly change from the dehumidifying and heating mode or the MAX cooling mode to send, directly into the outdoor heat exchanger 7, the refrigerant discharged from the compressor 2 as described later, to the heating mode, the dehumidifying and cooling mode or the cooling mode to send, into the radiator 4, the refrigerant discharged from the compressor 2.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Additionally, in FIG. 1, reference numeral 23 denotes an auxiliary heater as an auxiliary heating device disposed in the vehicle air conditioning device 1 of the embodiment. The auxiliary heater 23 of the embodiment is constituted of a PTC heater which is an electric heater, and disposed in the air flow passage 3 on an air upstream side of the radiator 4 to the flow of the air in the air flow passage 3. Then, when the auxiliary heater 23 is energized to generate heat, the air in the air flow passage 3 which flows into the radiator 4 through the heat absorber 9 is heated. That is, the auxiliary heater 23 becomes a so-called heater core to perform or complement the heating of the vehicle interior.

Furthermore, in the air flow passage 3 on an air upstream side of the auxiliary heater 23, an air mix damper 28 is disposed to adjust a degree at which the air (the indoor or outdoor air) in the air flow passage 3, flowing into the air flow passage 3 and passed through the heat absorber 9, passes through the auxiliary heater 23 and the radiator 4. Further in the air flow passage 3 on an air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
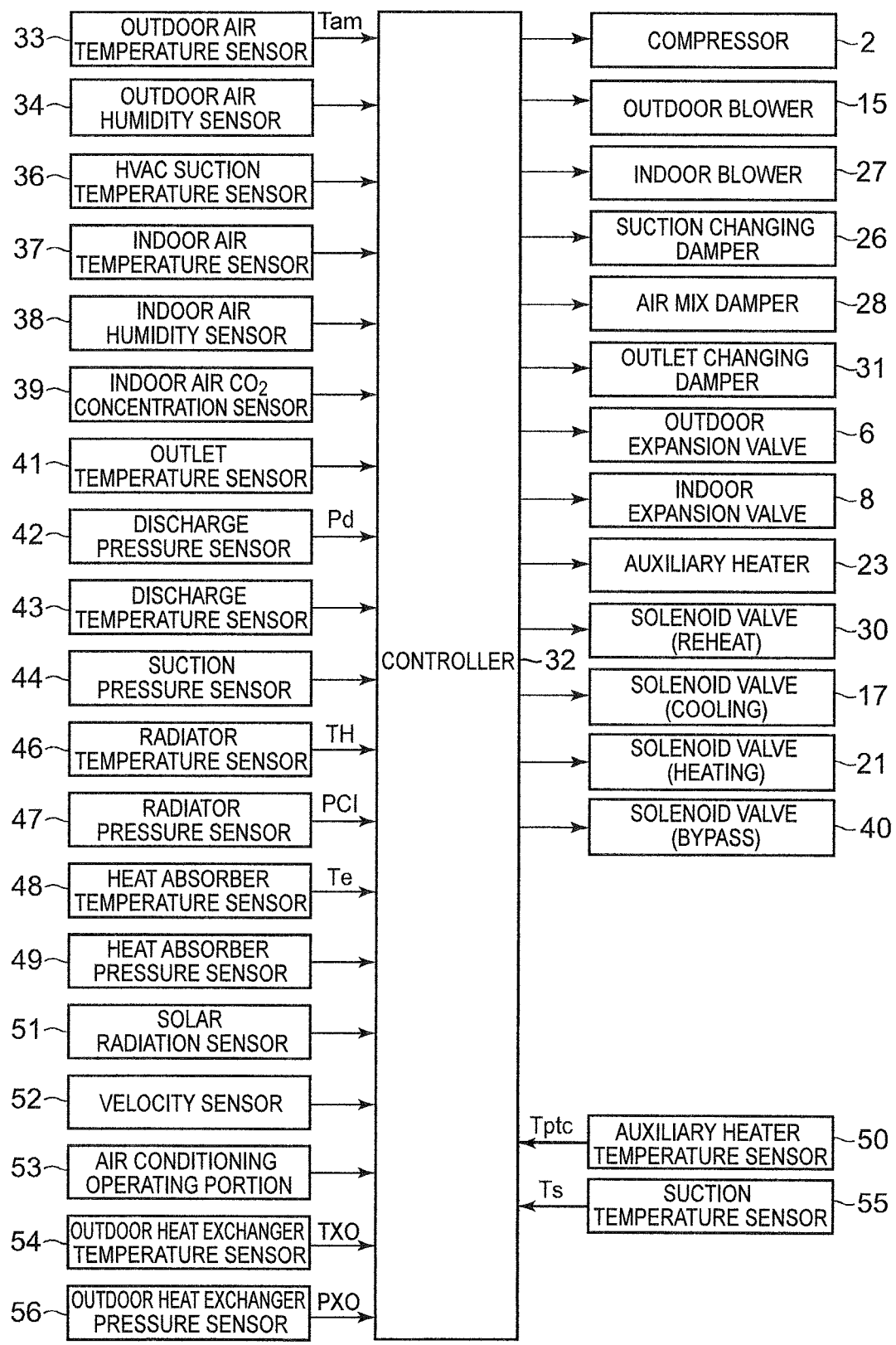
FIG. 2 is a block diagram of an electric circuit of a controller of the vehicle air conditioning device of FIG. 1.

Next, in FIG. 2, reference numeral 32 denotes a controller (ECU) as a control device constituted of a microcomputer which is an example of a computer including a processor, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a suction temperature sensor 55 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the switching between operation modes, an outdoor heat exchanger temperature sensor 54 which detects a temperature of the outdoor heat exchanger 7 (the temperature immediately after the refrigerant flows out from the outdoor heat exchanger 7, or the temperature of the outdoor heat exchanger 7 itself: an outdoor heat exchanger temperature TXO), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7: an outdoor heat exchanger pressure PXO). Furthermore, the input of the controller 32 is further connected to an output of an auxiliary heater temperature sensor 50 which detects a temperature of the auxiliary heater 23 (the temperature immediately after the air is heated by the auxiliary heater 23 or the temperature of the auxiliary heater 23 itself: an auxiliary heater temperature Tptc).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the auxiliary heater 23, and the respective solenoid valves, i.e., the solenoid valve 30 (for the reheating), the solenoid valve 17 (for the cooling), the solenoid valve 21 (for the heating) and the solenoid valve 40 (for the bypass). Then, the controller 32 controls these components on the basis of the outputs of the respective sensors and the setting input by the air conditioning operating portion 53.

Next, description will be made as to an operation of the vehicle air conditioning device 1 of the embodiment having the above constitution. In the embodiment, the controller 32 switches among and executes the respective operation modes of the heating mode, the dehumidifying and heating mode, the dehumidifying and cooling mode, the cooling mode and the MAX cooling mode (the maximum cooling mode). Description will initially be made as to a flow of the refrigerant and an outline of control in each operation mode.

(1) Heating Mode (First Operation Mode)

When the heating mode is selected by the controller 32 (an automatic mode) or a manual operation to the air conditioning operating portion 53 (a manual mode), the controller 32 opens the solenoid valve 21 for the heating and closes the solenoid valve 17 for the cooling. Furthermore, the controller opens the solenoid valve 30 for the reheating and closes the solenoid valve 40 for the bypass.

Then, the controller operates the compressor 2 and the respective blowers 15 and 27, and the air mix damper 28 has a state of sending, to the auxiliary heater 23 and the radiator 4, all the air in the air flow passage 3 that is blown out from the indoor blower 27 and passed through the heat absorber 9 as shown by a broken line in FIG. 1. In consequence, a high-temperature high-pressure gas refrigerant discharged from the compressor 2 flows into the radiator 4 through the solenoid valve 30 and the refrigerant pipe 13G. The air in the air flow passage 3 passes through the radiator 4, and hence the air in the air flow passage 3 heats by the high-temperature refrigerant in the radiator 4 (in the auxiliary heater 23 and the radiator 4, when the auxiliary heater 23 operates), whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation therein, and then the gas refrigerant is sucked into the compressor 2, thereby repeating this circulation. That is, the refrigerant flowing out from the outdoor heat exchanger 7 flows through the accumulator 12 without passing the heat absorber 9. Then, the air heated in the radiator 4 (in the auxiliary heater 23 and the radiator 4, when the auxiliary heater 23 operates) is blown out from the outlet 29, thereby performing the heating of the vehicle interior.

The controller 32 calculates a target radiator pressure PCO (a target value of the radiator pressure PCI) from a target radiator temperature TCO (a target value of the radiator temperature TH) calculated from an after-mentioned target outlet temperature TAO, and controls a number of revolution of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller 32 controls a valve position of the outdoor expansion valve 6 on the basis of the temperature (the radiator temperature TH) of the radiator 4 which is detected by the radiator temperature sensor 46 and the radiator pressure PCI detected by the radiator pressure sensor 47, and controls a subcool degree SC of the refrigerant in an outlet of the radiator 4. The target radiator temperature TCO is basically TCO=TAO, but a predetermined limit of controlling is provided.

Furthermore, in this heating mode, when a heating capability by the radiator 4 runs short to a heating capability required for vehicle interior air conditioning, the controller 32 controls the energization of the auxiliary heater 23 to complement the shortage by the heat generation of the auxiliary heater 23. In consequence, comfortable vehicle interior heating is achieved, and frosting of the outdoor heat exchanger 7 is inhibited. At this time, the auxiliary heater 23 is disposed on the air upstream side of the radiator 4, and hence the air flowing through the air flow passage 3 is passed through the auxiliary heater 23 before the radiator 4.

Here, if the auxiliary heater 23 is disposed on the air downstream side of the radiator 4 and when the auxiliary heater 23 is constituted of the PTC heater as in the embodiment, the temperature of the air flowing into the auxiliary heater 23 rises due to the radiator 4. Therefore, a resistance value of the PTC heater increases, and a current value decreases to also decrease an amount of heat to be generated, but the auxiliary heater 23 is disposed on the air upstream side of the radiator 4, so that it is possible to sufficiently exert a capability of the auxiliary heater 23 constituted of the PTC heater as in the embodiment.

(2) Dehumidifying and Heating Mode (Second Operation Mode)

Next, in the dehumidifying and heating mode, the controller 32 opens the solenoid valve 17 and closes the solenoid valve 21. Furthermore, the controller closes the solenoid valve 30, opens the solenoid valve 40, and adjusts the valve position of the outdoor expansion valve 6 to a shutoff position. Then, the controller operates the compressor 2 and the respective blowers 15 and 27. As shown by the broken line in FIG. 1, the air mix damper 28 achieves a state of sending, to the auxiliary heater 23 and the radiator 4, all the air in the air flow passage 3 that is blown out from the indoor blower 27 and passed through the heat absorber 9.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed, and then flows into the heat absorber 9 to evaporate. By a heat absorbing operation at this time, the air blown out from the indoor blower 27 is cooled, and water in the air coagulates to adhere to the heat absorber 9. Therefore, the air in the air flow passage 3 is cooled and dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation.

At this time, the valve position of the outdoor expansion valve 6 is adjusted to the shutoff position, so that it is possible to inhibit or prevent the disadvantage that the refrigerant discharged from the compressor 2 flows from the outdoor expansion valve 6 back into the radiator 4. Consequently, it is possible to inhibit or eliminate decrease of an amount of the refrigerant to be circulated, thereby acquiring an air conditioning capability. Furthermore, in this dehumidifying and heating mode, the controller 32 energizes the auxiliary heater 23 to generate heat. Consequently, the air cooled and dehumidified in the heat absorber 9 is further heated in a process of passing the auxiliary heater 23, and hence a temperature rises, thereby performing the dehumidifying and heating of the vehicle interior.

The controller 32 controls the number of revolution of the compressor 2 on the basis of the temperature (the heat absorber temperature Te) of the heat absorber 9 which is detected by the heat absorber temperature sensor 48 and a target heat absorber temperature TEO that is a target value of the heat absorber temperature, and the controller controls the energization (the heat generation) of the auxiliary heater 23 on the basis of the auxiliary heater temperature Tptc detected by the auxiliary heater temperature sensor 50 and the above-mentioned target radiator temperature TCO. Consequently, the drop of the temperature of the air blown out from the outlet 29 to the vehicle interior is accurately prevented by the heating of the auxiliary heater 23, while appropriately performing the cooling and dehumidifying of the air in the heat absorber 9.

In consequence, the temperature of the air blown out to the vehicle interior can be controlled at an appropriate heating temperature while dehumidifying the air, and it is possible to achieve comfortable and efficient dehumidifying and heating of the vehicle interior. Furthermore, as described above, in the dehumidifying and heating mode, the air mix damper 28 has a state of sending, through the auxiliary heater 23 and the radiator 4, all the air in the air flow passage 3. Therefore, the air passed through the heat absorber 9 is efficiently heated by the auxiliary heater 23, thereby improving energy saving properties, and controllability of the air conditioning for the dehumidifying and heating can improve.

It is to be noted that the auxiliary heater 23 is disposed on the air upstream side of the radiator 4, and hence the air heated by the auxiliary heater 23 passes through the radiator 4. However, in this dehumidifying and heating mode, the refrigerant does not flow through the radiator 4, and hence it is possible to eliminate the disadvantage that heat is absorbed, by the radiator 4, from the air heated by the auxiliary heater 23. Specifically, it is possible to inhibit the temperature drop of the air blown out to the vehicle interior by the radiator 4, and a coefficient of performance (COP) improves.

(3) Dehumidifying and Cooling Mode (First Operation Mode)

Next, in the dehumidifying and cooling mode, the controller 32 opens the solenoid valve 17 and closes the solenoid valve 21. The controller also opens the solenoid valve 30 and closes the solenoid valve 40. Then, the controller operates the compressor 2 and the respective blowers 15 and 27, and the air mix damper 28 has the state of sending, through the auxiliary heater 23 and the radiator 4, all the air in the air flow passage 3 that is blown out from the indoor blower 27 and passed through the heat absorber 9 as shown by the broken line in FIG. 1. Consequently, the high-temperature high-pressure gas refrigerant discharged from the compressor 2 flows through the solenoid valve 30 and flows from the refrigerant pipe 13G into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. In this dehumidifying and cooling mode, the controller 32 does not energize the auxiliary heater 23, and hence the air cooled and dehumidified in the heat absorber 9 is reheated in the process of passing the radiator 4 (a radiation capability is lower than that during the heating). Consequently, the dehumidifying and cooling of the vehicle interior is performed.

The controller 32 controls the number of revolution of the compressor 2 on the basis of the temperature of the heat absorber 9 (the heat absorber temperature Te) which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (the radiator pressure PCI).

(4) Cooling Mode (First Operation Mode)

Next, in the cooling mode, the controller 32 adjusts the valve position of the outdoor expansion valve 6 to a fully opened position in the above state of the dehumidifying and cooling mode. It is to be noted that the controller 32 controls the air mix damper 28 to adjust a ratio at which the air in the air flow passage 3, blown out from the indoor blower 27 and passed through the heat absorber 9, passes through the auxiliary heater 23 and the radiator 4 as shown by a solid line in FIG. 1. Furthermore, the controller 32 does not energize the auxiliary heater 23.

In consequence, the high-temperature high-pressure gas refrigerant discharged from the compressor 2 flows through the solenoid valve 30 and flows from the refrigerant pipe 13G into the radiator 4, and the refrigerant flowing out from the radiator 4 flows through the refrigerant pipe 13E to reach the outdoor expansion valve 6. At this time, the outdoor expansion valve 6 is fully opened, and hence the refrigerant passes the outdoor expansion valve to flow into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. By the heat absorbing operation at this time, the air blown out from the indoor blower 27 is cooled. Furthermore, the water in the air coagulates to adhere to the heat absorber 9.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior (a part of the air passes the radiator 4 to perform heat exchange), thereby performing the cooling of the vehicle interior. In this cooling mode, the controller 32 also controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(5) MAX Cooling Mode (Maximum Cooling Mode: Second Operation Mode)

Figure 3:
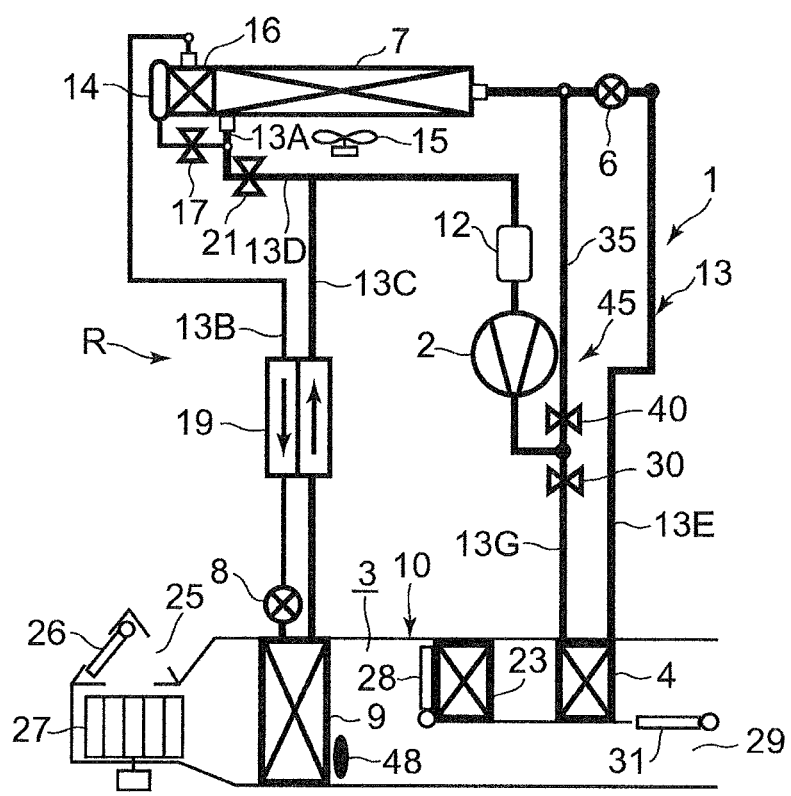
FIG. 3 is a constitutional view when the vehicle air conditioning device of FIG. 1 is in a MAX cooling mode (the maximum cooling mode)

Next, in the MAX cooling mode that is the maximum cooling mode, the controller 32 opens the solenoid valve 17 and closes the solenoid valve 21. The controller also closes the solenoid valve 30, opens the solenoid valve 40, and adjusts the valve position of the outdoor expansion valve 6 to the shutoff position. Then, the controller operates the compressor 2 and the respective blowers 15 and 27, and the air mix damper 28 has a state where the air in the air flow passage 3 does not pass through the auxiliary heater 23 and the radiator 4 as shown in FIG. 3. However, even when the air slightly passes, there are not any problems. Furthermore, the controller 32 does not energize the auxiliary heater 23.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed and then flows into the heat absorber 9 to evaporate. By the heat absorbing operation at this time, the air blown out from the indoor blower 27 is cooled. Furthermore, the water in the air coagulates to adhere to the heat absorber 9, and hence the air in the air flow passage 3 is dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation. At this time, the outdoor expansion valve 6 is shut off, so that it is similarly possible to inhibit or prevent the disadvantage that the refrigerant discharged from the compressor 2 flows from the outdoor expansion valve 6 back into the radiator 4. Consequently, it is possible to inhibit or eliminate the decrease of the amount of the refrigerant to be circulated, and it is possible to acquire the air conditioning capability.

Here, in the above-mentioned cooling mode, the high-temperature refrigerant flows through the radiator 4, and hence direct heat conduction from the radiator 4 to the HVAC unit 10 considerably occurs, but the refrigerant does not flow through the radiator 4 in this MAX cooling mode. Therefore, the air from the heat absorber 9 in the air flow passage 3 is not heated by heat transmitted from the radiator 4 to the HVAC unit 10. Consequently, powerful cooling of the vehicle interior is performed, and especially under an environment where the outdoor air temperature Tam is high, the vehicle interior can rapidly be cooled to achieve the comfortable air conditioning of the vehicle interior. Also in this MAX cooling mode, the controller 32 controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(6) Switching Between Operation Modes

The air circulated in the air flow passage 3 is subjected to the cooling from the heat absorber 9 and a heating operation from the radiator 4 (and the auxiliary heater 23) (adjusted by the air mix damper 28) in the above respective operation modes, and the air is blown out from the outlet 29 into the vehicle interior. The controller 32 calculates the target outlet temperature TAO on the basis of the outdoor air temperature Tam detected by the outdoor air temperature sensor 33, the temperature of the vehicle interior which is detected by the indoor air temperature sensor 37, the blower voltage, the solar radiation amount detected by the solar radiation sensor 51 and others, and the target vehicle interior temperature (the predetermined temperature) set in the air conditioning operating portion 53. The controller switches among the respective operation modes, and controls the temperature of the air blown out from the outlet 29 at this target outlet temperature TAO.

In this case, the controller 32 changes the operation mode from the heating mode to the dehumidifying and heating mode, from the dehumidifying and heating mode to the dehumidifying and cooling mode, from the dehumidifying and cooling mode to the cooling mode, from the cooling mode to the MAX cooling mode, from this MAX cooling mode to the cooling mode, from the cooling mode to the dehumidifying and cooling mode, from the dehumidifying and cooling mode to the dehumidifying and heating mode, and from the dehumidifying and heating mode to the heating mode on the basis of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and presence/absence of requirement for the dehumidifying of the vehicle interior. Furthermore, there is also a case where the controller changes from the heating mode to the dehumidifying and cooling mode or the cooling mode, and from the dehumidifying and cooling mode or the cooling mode to the heating mode. In the embodiment, the controller changes the respective operation modes as described above, to accurately switch among the heating mode, the dehumidifying and heating mode, the dehumidifying and cooling mode, the cooling mode and the MAX cooling mode in accordance with environment conditions or necessity for the dehumidifying, thereby achieving comfortable and efficient air conditioning of the vehicle interior.

Embodiment 1

Figure 4:
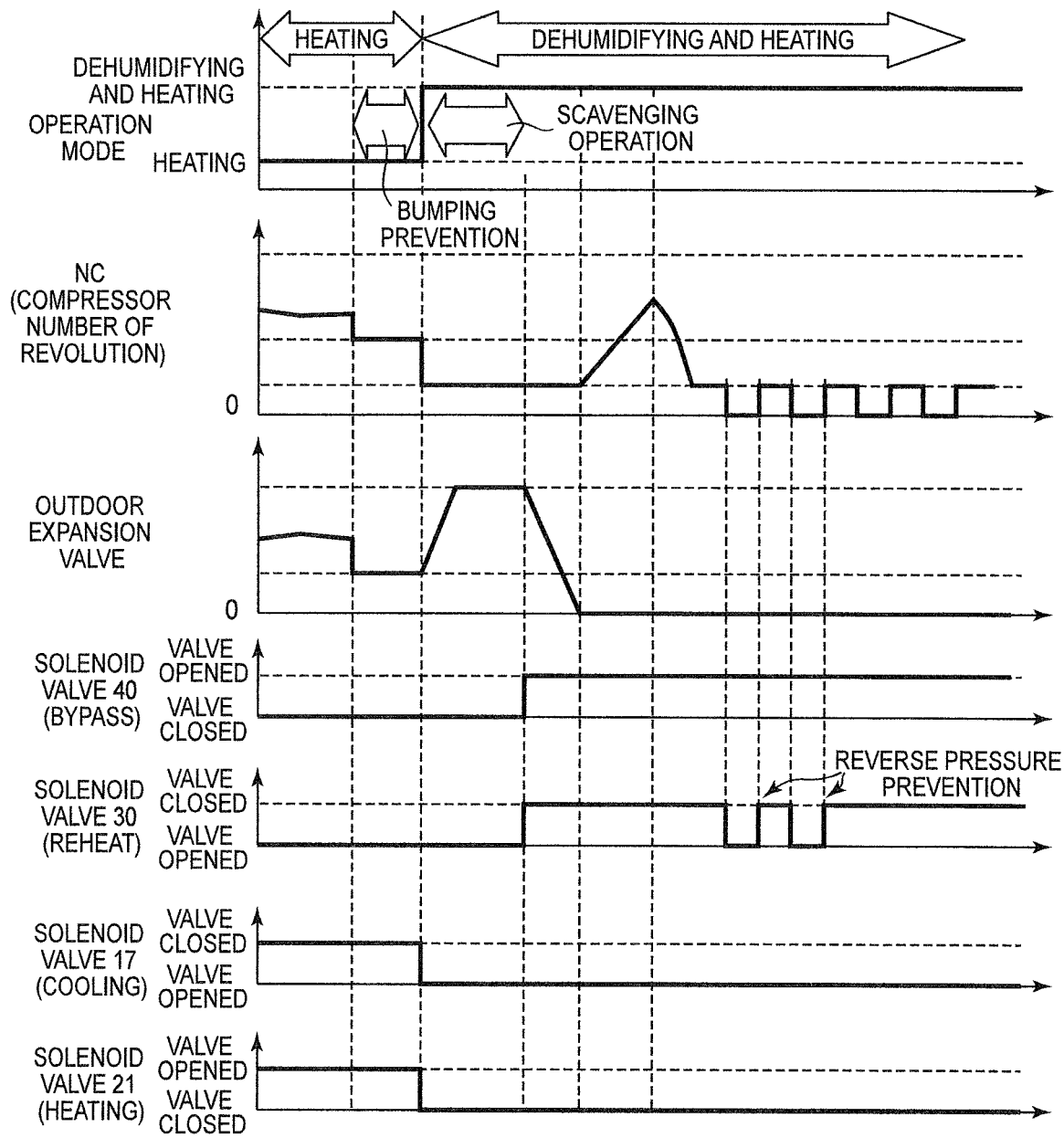
FIG. 4 is a timing chart of each device to explain an example of reverse pressure preventing control to be executed by the controller of FIG. 2 when changing from the heating mode to the dehumidifying and heating mode (Embodiment 1)

(7) Bumping Preventing Control, Refrigerant Scavenging Operation and Reverse Pressure Preventing Control (No. 1) at Change from Heating Mode to Dehumidifying and Heating Mode Next, description will be made as to bumping preventing control to be executed by the controller 32 when changing from the above heating mode (the first operation mode) to the dehumidifying and heating mode (the second operation mode), a refrigerant scavenging operation, and reverse pressure preventing control after shift, with reference to FIG. 4.

(7-1) Bumping Preventing Control

Here, as described above, the refrigerant and oil flowing out from the compressor 2 through the refrigerant circuit R flow into the accumulator 12 when the compressor 2 is stopped, their liquid part is accumulated in the accumulator 12, and the oil having a smaller specific weight forms a layer on the liquid refrigerant, thereby bringing about a state of being closed with a lid. Particularly, in the heating mode, there increase amounts of the liquid refrigerant and oil which flow out from the outdoor heat exchanger 7 through the solenoid valve 21 into the accumulator 12 and are accumulated therein.

In this state, when the operation mode changes from the heating mode to the dehumidifying and heating mode, the refrigerant flowing out from the outdoor heat exchanger 7 flows from the solenoid valve 17 in a direction of the indoor expansion valve 8. Then, the compressor 2 sucks the refrigerant in the accumulator 12, and hence a pressure in the accumulator 12 rapidly drops. Then, bumping occurs where the refrigerant below the oil boils and vaporizes without stopping, and intensely breaks through the upper oil layer, thereby causing excessive liquid return to the compressor 2 and generating sound (noise).

To eliminate such problem, when changing from the heating mode to the dehumidifying and heating mode, the controller 32 executes the bumping preventing control which will be described below. Description will be made as to an example of the bumping preventing control to be executed by the controller 32 when changing the operation mode of the vehicle air conditioning device 1 from the above-mentioned heating mode (the first operation mode) to the dehumidifying and heating mode (the second operation mode), with reference to FIG. 4. A timing chart of FIG. 4 shows a number of revolution NC of the compressor 2, the valve position of the outdoor expansion valve 6, and states of the solenoid valve 40 (bypass), the solenoid valve 30 (reheating), the solenoid valve 17 (cooling) and the solenoid valve 21 (heating), when shifting from the heating mode to the dehumidifying and heating mode.

The controller 32 reduces and maintains the valve position of the outdoor expansion valve 6 for a predetermined period of time before shifting from the heating mode to the dehumidifying and heating mode. Furthermore, the controller maintains the number of revolution NC of the compressor 2 which is higher than a lower limit of an operation range for this period of time.

Thus, the valve position of the outdoor expansion valve 6 is reduced, so that most of the refrigerant discharged from the compressor 2 is dammed up in the radiator 4 and the refrigerant pipe 13E between the radiator 4 and the outdoor expansion valve 6 (actually also including the pipe 13G between the solenoid valve 30 and the radiator 4) before shifting from the heating mode to the dehumidifying and heating mode, and the subcool degree SC of the refrigerant in the radiator 4 increases. Therefore, the refrigerant flowing from the outdoor expansion valve 6 through the outdoor heat exchanger 7 and the solenoid valve 21 into the accumulator 12 is limited.

In consequence, an amount of a liquid refrigerant to be stored in the accumulator 12 is decreased before shifting to the dehumidifying and heating mode. Therefore, there decreases impact of bumping which occurs when the mode shifts to the dehumidifying and heating mode and a pressure in the accumulator 12 drops as described later. Consequently, liquid compression in the compressor 2 and generation of noise in the accumulator 12 are effectively eliminated or inhibited. In consequence, reliability of the vehicle air conditioning device 1 enhances, and comfort of passengers also effectively improves.

In this case, the controller 32 maintains a high number of revolution NC of the compressor 2 for the predetermined period of time before shifting to the dehumidifying and heating mode. Consequently, it is possible to rapidly move the refrigerant in the accumulator 12 into the radiator 4 and the refrigerant pipe 13E between the radiator 4 and the outdoor expansion valve 6, and it is possible to speed up the changing to the dehumidifying and heating mode.

(7-2) Refrigerant Scavenging Operation

Furthermore, as described above, in the dehumidifying and heating mode, the solenoid valve 30 is closed and the outdoor expansion valve 6 is also shut off, thereby bringing about a state where any refrigerant is not sent through the radiator 4. Consequently, when the heating mode is changed to the dehumidifying and heating mode, the refrigerant remaining in the radiator 4 is laid up therein for a long time, and the amount of the refrigerant to be circulated decreases. In particular, when the bumping preventing control is executed as described above, the amount of the refrigerant remaining in the radiator 4 increases.

To eliminate the problem, the controller 32 executes a refrigerant scavenging operation when changing from the heating mode to the dehumidifying and heating mode in the embodiment. This refrigerant scavenging operation is executed after the above-mentioned bumping preventing control is ended. That is, after elapse of the predetermined period of time of the above-mentioned bumping preventing control, the controller 32 firstly closes the solenoid valve 21, and opens the solenoid valve 17 (the dehumidifying and heating mode starts here). It is to be noted that at this point of time, the solenoid valve 30 and the solenoid valve 40 are not changed.

Then, the controller 32 starts the refrigerant scavenging operation. In this refrigerant scavenging operation, the controller 32 enlarges (e.g., fully opens) the valve position of the outdoor expansion valve 6 only for a predetermined period of time. This state is similar to the state of the cooling mode. Furthermore, in the embodiment, a number of revolution NC of the compressor 2 is lowly maintained (e.g., the minimum number of revolution of controlling) from the start of this refrigerant scavenging operation.

Consequently, the refrigerant present in a region including the radiator 4 and extending from the solenoid valve 30 to the outdoor expansion valve 6 is expelled in a direction of the outdoor heat exchanger 7 (scavenging). Then, after elapse of a predetermined period of time, the controller ends the refrigerant scavenging operation, closes the solenoid valve 30, opens the solenoid valve 40, and closes the outdoor expansion valve 6 toward its shutoff position. Thus, the outdoor expansion valve 6 is shut off, and then the controller 32 shifts to a state of controlling the number of revolution of the compressor 2 in the dehumidifying and heating mode. By such a refrigerant scavenging operation, the refrigerant is prevented from being laid up for a long time in the radiator 4 or the like, and the amount of the refrigerant to be circulated in the refrigerant circuit R is acquired to prevent deterioration of an air conditioning performance.

Furthermore, the controller 32 closes the solenoid valve 30 and opens the solenoid valve 40 after the refrigerant scavenging operation is executed, the controller lowly maintains the number of revolution NC of the compressor 2 until the outdoor expansion valve 6 closes after the start of the refrigerant scavenging operation, and the controller raises the number of revolution of the compressor 2 after the outdoor expansion valve 6 is closed. Therefore, it is possible to decrease a difference between pressures before and after the solenoid valve 40 (on an upstream side and a downstream side) when opening the solenoid valve 40. In consequence, generation of noise in opening the solenoid valve 40 is avoided.

Here, as in the embodiment, in the dehumidifying and heating mode, the controller 32 executes the refrigerant scavenging operation to open the outdoor expansion valve 6 and enlarge its valve position for a predetermined period of time, when the mode is shifted to the dehumidifying and heating mode. Consequently, a high pressure is present in the outdoor heat exchanger 7 and a low pressure is present in the accumulator 12. However, the solenoid valve 21 is not opened during this refrigerant scavenging operation, and hence any noise is not generated in the solenoid valve 21. Therefore, according to the embodiment, it is possible to prevent or inhibit bumping in the accumulator 12 while avoiding the generation of the noise in the solenoid valve 21.

(7-3) Reverse Pressure Preventing Control (No. 1)

Furthermore, as described above, in the dehumidifying and heating mode, the solenoid valve 30 is closed, the outdoor expansion valve 6 is also shut off, and the refrigerant is confined in the radiator 4 and others. In particular, if the pressure on the upstream side of the solenoid valve 30 (on the discharge side of the compressor 2) drops during the stop of the compressor 2 immediately after the shift to the dehumidifying and heating mode, the pressure on the downstream side (the radiator 4 side) of the solenoid valve 30 may become higher. In such a reverse pressure state, there is the risk that hunting occurs in the solenoid valve 30 to generate noise and its durability deteriorates.

To eliminate the problem, in the embodiment, after the mode is shifted to the dehumidifying and heating mode, the controller 32 executes the reverse pressure preventing control to open the solenoid valve 30 at a timing to stop the compressor 2. In consequence, it is possible to eliminate the disadvantage that the reverse pressure is applied to the solenoid valve 30 during the stop of the compressor 2 after the mode is shifted to the dehumidifying and heating mode to close the solenoid valve 30 and open the solenoid valve 40, and it is possible to previously eliminate or inhibit the disadvantage that the hunting occurs in the solenoid valve 30 to generate noise or the problem that durability of the solenoid valve 30 deteriorates.

However, the controller 32 limits this control to open the solenoid valve 30, for example, until the second timing to stop the compressor 2 after the mode is shifted to the dehumidifying and heating mode. In consequence, unnecessary opening/closing of the solenoid valve 30 is avoided (provided that the number of times may be one or three or more).

Embodiment 2

Figure 5:
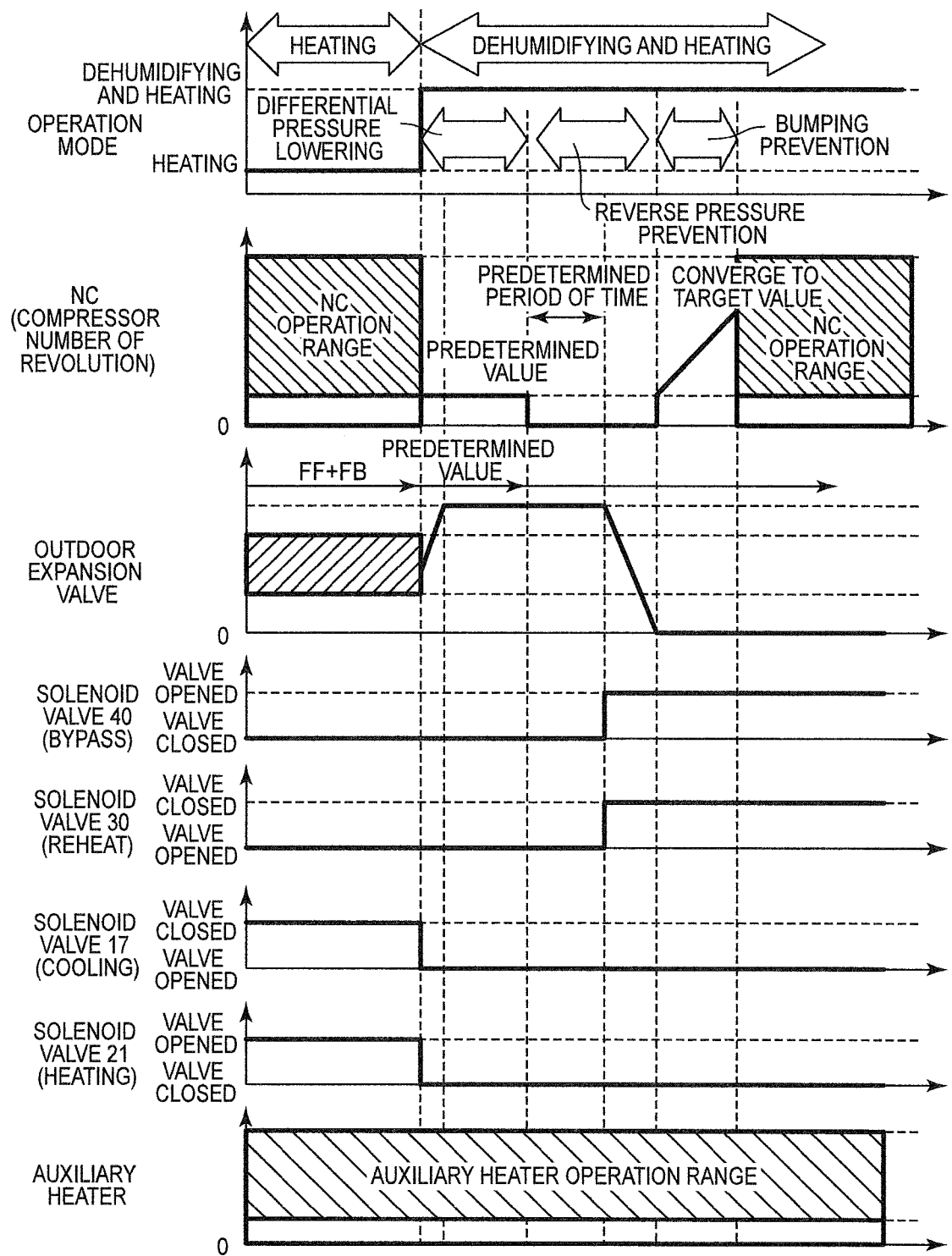
FIG. 5 is a timing chart of each device to explain another example of the reverse pressure preventing control to be executed by the controller of FIG. 2 when changing from the heating mode to the dehumidifying and heating mode (Embodiment 2)

(8) Differential Pressure Lowering Control, Reverse Pressure Preventing Control (No. 2), and Bumping Preventing Control at Change from Heating Mode to Dehumidifying and Heating Mode Next, description will be made as to another embodiment of the control to be executed by the controller 32 when changing from the above heating mode (the first operation mode) to the dehumidifying and heating mode (the second operation mode), with reference to FIG. 5. In this embodiment, the controller 32 executes differential pressure lowering control, reverse pressure preventing control and bumping preventing control as shown in FIG. 5, when changing from the heating mode to the dehumidifying and heating mode.

(8-1) Differential Pressure Lowering Control

Here, in the heating mode, the solenoid valve 40 is closed and in the dehumidifying and heating mode, the solenoid valve 40 is opened. However, in the heating mode, the pressure on the inlet side of the solenoid valve 40 corresponds to the pressure on the discharge side of the compressor 2, and is high, and the pressure on the outlet side thereof has a low pressure state on the outlet side of the outdoor expansion valve 6. In such a state, when the solenoid valve 40 opens, large noise is generated. Consequently, when the heating mode is shifted to the dehumidifying and heating mode, the controller 32 firstly executes the differential pressure lowering control for a predetermined period of time (T1).

Description will be made as to an example of the differential pressure lowering control to be executed by the controller 32 when changing the operation mode of the vehicle air conditioning device 1 from the heating mode (the first operation mode) to the dehumidifying and heating mode (the second operation mode), with reference to FIG. 5. A timing chart of FIG. 5 shows the number of revolution NC of the compressor 2, the valve position of the outdoor expansion valve 6, and states of the solenoid valve 40 (bypass), the solenoid valve 30 (reheating), the solenoid valve 17 (cooling), the solenoid valve 21 (heating) and the auxiliary heater 23, when shifting from the heating mode to the dehumidifying and heating mode.

In the heating mode, the controller 32 executes feedforward and feedback control of the outdoor expansion valve 6. However, the controller opens the solenoid valve 17 in this heating mode, and closes the solenoid valve 21 to shift to the dehumidifying and heating mode. Afterward, the controller enlarges the valve position of the outdoor expansion valve 6 to a large predetermined value (a fully opened position in the embodiment) and maintains the position for the predetermined period of time (T1), before opening the solenoid valve 40 and closing the solenoid valve 30. Furthermore, the number of revolution NC of the compressor 2 is maintained at a low predetermined value for this predetermined period of time (T1). Thus, the valve position of the outdoor expansion valve 6 is enlarged, thereby raising the pressure on the outlet side of the solenoid valve 40, and the number of revolution NC of the compressor 2 is decreased, thereby lowering the pressure on the inlet side of the solenoid valve 40. Consequently, a difference in pressure (a differential pressure) between the inlet side of the solenoid valve 40 and the outlet side thereof decreases. In consequence, generation of noise in opening the solenoid valve 40 thereafter is prevented or inhibited.

(8-2) Reverse Pressure Preventing Control (No. 2)

The differential pressure lowering control for this predetermined period of time (T1) ends, and then the controller 32 shifts to reverse pressure preventing control. In this reverse pressure preventing control, the controller 32 opens the solenoid valve 30, closes the solenoid valve 40, and adjusts the valve position of the outdoor expansion valve 6 to a fully opened position. In this state, the compressor 2 is stopped for a predetermined period of time (T2). Consequently, the radiator pressure PCI lowers.

Then, after elapse of this predetermined period of time (T2), the controller closes the solenoid valve 30, opens the solenoid valve 40, closes the outdoor expansion valve 6 toward its shutoff valve position, and finally shuts off the outdoor expansion valve (the reverse pressure preventing control is executed up to here). The controller then starts the compressor 2. In this way, when the heating mode shifts to the dehumidifying and heating mode, the controller stops the compressor 2 prior to execution of control to each of the closing of the solenoid valve 30, the opening of the solenoid valve 40 and the shutoff of the outdoor expansion valve 6. Then, the controller closes the solenoid valve 30, opens the solenoid valve 40, shuts off the outdoor expansion valve 6, and then starts the compressor 2. Consequently, when the controller closes the solenoid valve 30 and shuts off the outdoor expansion valve 6, the compressor 2 is stopped, and it is possible to lower a pressure in the refrigerant circuit R including a radiator 4 and extending from the solenoid valve 30 to the outdoor expansion valve 6.

In consequence, when the mode is shifted to the dehumidifying and heating mode to close the solenoid valve 30 and open the solenoid valve 40, it is possible to eliminate or inhibit the disadvantage that a reverse pressure is applied to the solenoid valve 30, and it is possible to previously eliminate or inhibit the disadvantage that the hunting occurs in the solenoid valve 30 to generate the noise or the problem that the durability of the solenoid valve 30 deteriorates.

Furthermore, in the dehumidifying and heating mode, heat is generated in the auxiliary heater 23 after the shift, and hence evaporation of the refrigerant in the radiator 4 is promoted. Consequently, after the shift to the dehumidifying and heating mode, while the solenoid valve 30 is opened and the outdoor expansion valve 6 is fully opened, the refrigerant rapidly flows out from the radiator 4, and hence it is possible to lower a level of the reverse pressure applied to the solenoid valve 30.

(8-3) Bumping Preventing Control

After this reverse pressure preventing control is executed, the controller 32 executes the bumping preventing control. In the bumping preventing control of this embodiment, the controller 32 starts the compressor 2, gradually increases the number of revolution NC of the compressor so that the number finally converges to a target value, and shifts to a control state in an operation range of the dehumidifying and heating mode. Thus, the controller gradually increases the number of revolution NC of the compressor 2 instead of rapidly increasing the number, thereby preventing rapid pressure drop in the accumulator 12 and eliminating or inhibiting occurrence of bumping therein.

Figure 6:
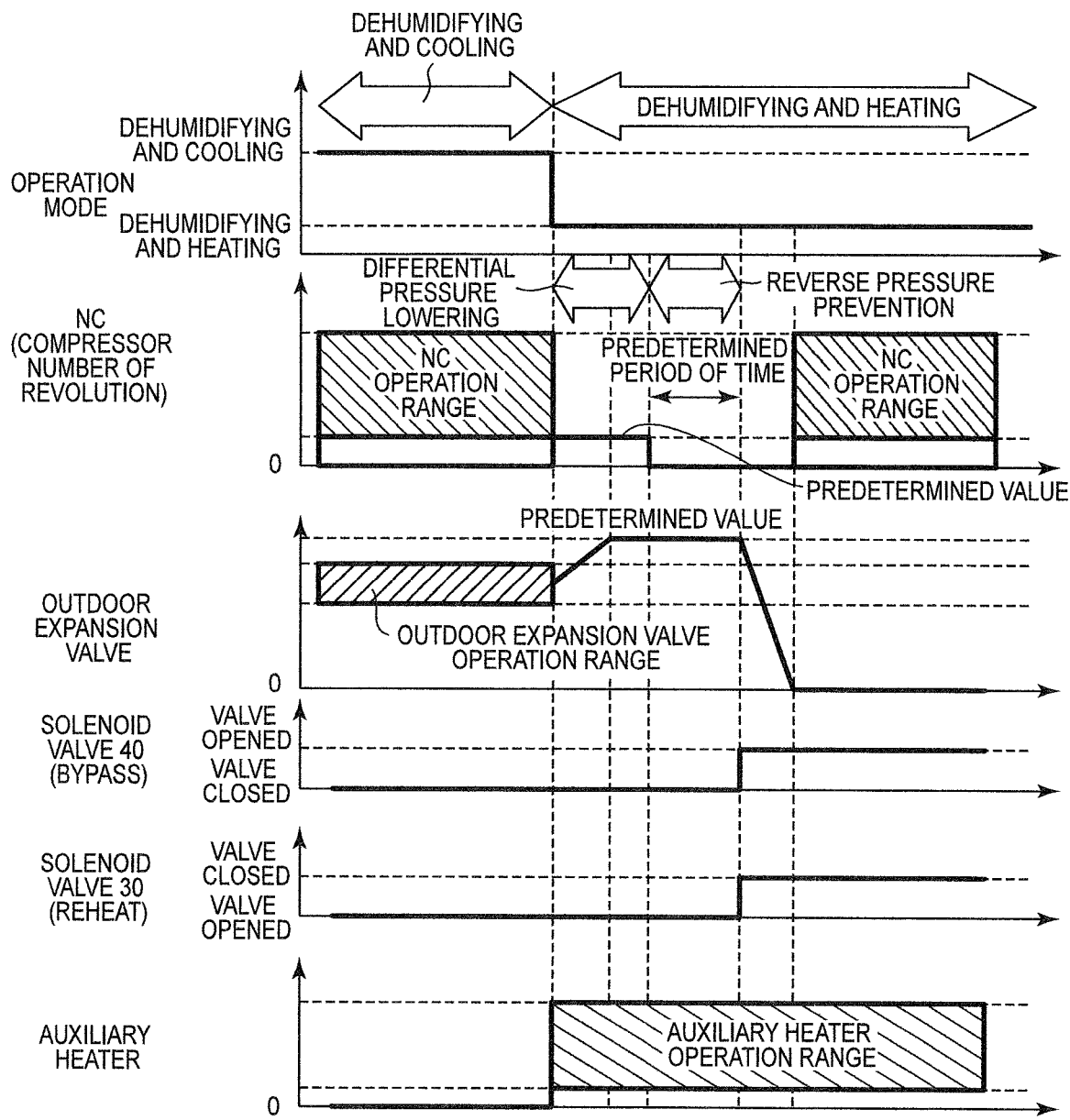
FIG. 6 is a timing chart of each device to explain an example of the reverse pressure preventing control to be executed by the controller of FIG. 2 when changing from the dehumidifying and cooling mode to the dehumidifying and heating mode (Embodiment 2).

(9) Differential Pressure Lowering Control and Reverse Pressure Preventing Control at Change from Dehumidifying and Cooling Mode to Dehumidifying and Heating Mode Next, description will be made as to control to be executed by the controller 32 when changing from the above dehumidifying and cooling mode (the first operation mode) to the dehumidifying and heating mode (the second operation mode), with reference to FIG. 6. In this embodiment, the controller 32 executes the differential pressure lowering control and reverse pressure preventing control as shown in FIG. 6, when changing from the dehumidifying and cooling mode to the dehumidifying and heating mode.

(9-1) Differential Pressure Lowering Control

Also in the dehumidifying and cooling mode, the solenoid valve 40 is closed, and in the dehumidifying and heating mode, the solenoid valve 40 is opened. However, in the dehumidifying and cooling mode, the pressure on the inlet side of the solenoid valve 40 corresponds to the pressure on the discharge side of the compressor 2, and is high, and due to the pressure on the outlet side thereof, the solenoid valve tends to slightly open, but has a low pressure state on the outlet side of the outdoor expansion valve 6. When the solenoid valve 40 is opened in such a state, noise is similarly generated. Consequently, also when the dehumidifying and cooling mode is shifted to the dehumidifying and heating mode, the controller 32 firstly executes the differential pressure lowering control for a predetermined period of time (T3).

Description will be made as to an example of the differential pressure lowering control to be executed by the controller 32 when changing the operation mode of the vehicle air conditioning device 1 from the dehumidifying and cooling mode (the first operation mode) to the dehumidifying and heating mode (the second operation mode), with reference to FIG. 6. A timing chart of FIG. 6 shows the number of revolution NC of the compressor 2, the valve position of the outdoor expansion valve 6, and the states of the solenoid valve 40 (bypass), the solenoid valve 30 (reheat) and the auxiliary heater 23, when shifting from the dehumidifying and cooling mode to the dehumidifying and heating mode.

When the dehumidifying and cooling mode is shifted to the dehumidifying and heating mode and before the solenoid valve 40 is opened and the solenoid valve 30 is closed, the controller 32 enlarges the valve position of the outdoor expansion valve 6 up to a large predetermined value (a fully opened position in the embodiment) to maintain the valve position for the predetermined period of time (T3). Furthermore, the controller maintains the number of revolution NC of the compressor 2 at a predetermined low value for this predetermined period of time (T3). Thus, the valve position of the outdoor expansion valve 6 is enlarged, thereby increasing the pressure on the outlet side of the solenoid valve 40, and the number of revolution NC of the compressor 2 is lowered, thereby decreasing the pressure on the inlet side of the solenoid valve 40. Consequently, the difference in pressure (the differential pressure) between the inlet side of the solenoid valve 40 and the outlet side thereof decreases. In consequence, the generation of the noise in opening the solenoid valve 40 is then prevented or inhibited.

(9-2) Reverse Pressure Prevention Control (No. 2)

When the differential pressure lowering control for the predetermined period of time (T3) is ended, the controller 32 shifts to the reverse pressure preventing control. In this case, according to the reverse pressure preventing control, the controller 32 opens the solenoid valve 30, closes the solenoid valve 40, and fully opens the outdoor expansion valve 6, and in a fully opened position of the outdoor expansion valve, the compressor 2 is stopped for a predetermined period of time (T4). Consequently, the radiator pressure PCI drops.

Then, after elapse of this predetermined period of time (T4), the controller closes the solenoid valve 30, opens the solenoid valve 40, closes the outdoor expansion valve 6 to adjust its valve position toward a shutoff position, and finally shuts off the outdoor expansion valve (the reverse pressure preventing control is executed up to here). Then, the controller starts the compressor 2 and shifts to a control state in the operation range of the dehumidifying and heating mode. Thus, when the dehumidifying and cooling mode shifts to the dehumidifying and heating mode, the controller stops the compressor 2 prior to execution of control to each of the closing of the solenoid valve 30, the opening of the solenoid valve 40 and the shutoff of the outdoor expansion valve 6. Then, the controller closes the solenoid valve 30, opens the solenoid valve 40, shuts off the outdoor expansion valve 6, and then starts the compressor 2. Consequently, when the solenoid valve 30 is closed and the outdoor expansion valve 6 is shut off, the compressor 2 is stopped, and it is possible to lower the pressure in the refrigerant circuit R including the radiator 4 and extending from the solenoid valve 30 to the outdoor expansion valve 6.

Consequently, when the mode is shifted to the dehumidifying and heating mode where the solenoid valve 30 is closed and the solenoid valve 40 is opened, it is possible to eliminate or inhibit the disadvantage that the reverse pressure is applied to the solenoid valve 30, and it is possible to previously eliminate or inhibit the disadvantage that the hunting occurs in the solenoid valve 30 to generate the noise or the problem that the durability of the solenoid valve 30 deteriorates.

Furthermore, heat is generated in the auxiliary heater 23 when the mode is shifted to the dehumidifying and heating mode, and hence evaporation of the refrigerant in the radiator 4 is promoted. Consequently, when the mode is shifted to the dehumidifying and heating mode where the solenoid valve 30 is opened and the outdoor expansion valve 6 is fully opened, the refrigerant rapidly flows out from the radiator 4. In consequence, it is possible to decrease a level of the reverse pressure applied to the solenoid valve 30.

Embodiment 3

(10) Reverse Pressure Preventing Control (No. 3) in Dehumidifying and Heating Mode Next, description will be made as to still another embodiment of the reverse pressure preventing control to be executed by the controller 32 in the dehumidifying and heating mode (the second operation mode). In this case, the controller 32 always monitors pressures on an inlet side and an outlet side of the solenoid valve 30 in the dehumidifying and heating mode. It is to be noted that in this embodiment, the controller judges the pressure on the inlet side of the solenoid valve 30 from the above-mentioned discharge pressure Pd detected by the discharge pressure sensor 42, and judges the pressure on the outlet side of the solenoid valve 30 from the above-mentioned radiator pressure PCI detected by the radiator pressure sensor 47.

Then, in the embodiment, when the pressure PCI on the outlet side of the solenoid valve 30 becomes higher than the pressure Pd on the inlet side thereof (PCI>Pd), the controller 32 opens the solenoid valve 30. Consequently, when the mode is shifted to the dehumidifying and heating mode where the solenoid valve 30 is closed and the solenoid valve 40 is opened, the reverse pressure is applied to the solenoid valve 30, and in this situation, the reverse pressure can rapidly be eliminated. In consequence, it is possible to inhibit or previously eliminate the disadvantage that the hunting occurs in the solenoid valve 30 to generate the noise or the problem that the durability of the solenoid valve 30 deteriorates. Here, when the pressure PCI on the outlet side of the solenoid valve 30 is less than or equal to the pressure Pd on the inlet side thereof (PCI Pd), the controller 32 closes the solenoid valve 30 again.

It is to be noted that in Embodiment 1 mentioned above, there has been described the case where the heating mode (the first operation mode) shifts to the dehumidifying and heating mode (the second operation mode), but the present invention is not limited thereto, and is also effective for a case where the dehumidifying and cooling mode (the first operation mode) shifts to the dehumidifying and heating mode (the second operation mode).

Furthermore, in the above respective embodiments, the dehumidifying and heating mode has been adopted and described as the second operation mode, but the present invention is not limited thereto, and is also effective when the control of each embodiment described above is executed after the shift to the MAX cooling mode.

Additionally, in the embodiment, the present invention is applied to the vehicle air conditioning device 1 which switches between and executes the heating mode, the dehumidifying and heating mode, the dehumidifying and cooling mode, the cooling mode and the MAX cooling mode, but the present invention is not limited thereto. The inventions of claim 1 to claim 5 are also effective for the vehicle air conditioning device which switches between and executes at least one of the first operation modes (the heating mode, the dehumidifying and cooling mode, and the cooling mode) and at least one of the second operation modes (the dehumidifying and heating mode and the MAX cooling mode).

However, when the first operation mode is the heating mode or the dehumidifying and cooling mode and the second operation mode is the dehumidifying and heating mode as in each embodiment, heat is generated in the auxiliary heater 23 after the shift to the dehumidifying and heating mode often shifted from the heating mode or the dehumidifying and cooling mode. Consequently, the evaporation of the refrigerant in the radiator 4 is promoted. In consequence, when the mode is shifted to the dehumidifying and heating mode where the solenoid valve 30 and the outdoor expansion valve 6 are opened, the refrigerant rapidly flows out from the radiator 4. In consequence, it is possible to decrease the level of the reverse pressure applied to the solenoid valve 30.

The present invention is not limited to the changing control of the respective operation modes described in the embodiments, and appropriate conditions may be set by employing one, any combination or all of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and the presence/absence of the requirement for the dehumidifying of the vehicle interior, in accordance with the capability and use environment of the vehicle air conditioning device.

Additionally, the auxiliary heating device is not limited to the auxiliary heater 23 described in the embodiments, and a heating medium circulating circuit which circulates a heating medium heated by a heater to heat air in an air flow passage, a heater core which circulates radiator water heated by an engine or the like may be utilized. Furthermore, the constitutions of the refrigerant circuit R which are described in the above respective embodiments are not limited thereto, and needless to say, the constitutions are changeable without departing from the gist of the present invention.

DESCRIPTION OF REFERENCE NUMERALS

1 vehicle air conditioning device
2 compressor
3 air flow passage
4 radiator
6 outdoor expansion valve
7 outdoor heat exchanger
8 indoor expansion valve
9 heat absorber
12 accumulator
17 solenoid valve
21 solenoid valve
23 auxiliary heater (an auxiliary heating device)
27 indoor blower (a blower fan)
28 air mix damper
30 solenoid valve (a first solenoid valve)
40 solenoid valve (a second solenoid valve)
32 controller (a control device)
35 bypass pipe
45 bypass device
R refrigerant circuit

The invention claimed is:
1. A vehicle air conditioning device comprising:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior,
an outdoor expansion valve to decompress the refrigerant flowing out from the radiator and flowing into the outdoor heat exchanger,
a first opening/closing valve disposed between a discharge side of the compressor and an inlet side of the radiator,
a bypass pipe which branches on an upstream side of the first opening/closing valve and bypasses the radiator and the outdoor expansion valve to send, to the outdoor heat exchanger, the refrigerant discharged from the compressor,
a second opening/closing valve disposed in the bypass pipe, and
a control device,
so that the control device switches between and executes a first operation mode to open the first opening/closing valve, close the second opening/closing valve, thereby send the refrigerant discharged from the compressor to the radiator, and send the refrigerant flowing out from the radiator through the outdoor expansion valve to the outdoor heat exchanger, and
a second operation mode to shut off the outdoor expansion valve, close the first opening/closing valve, open the second opening/closing valve, thereby send the refrigerant discharged from the compressor through the bypass pipe to the outdoor heat exchanger, and send the refrigerant flowing out from the outdoor heat exchanger to the heat absorber,
wherein in the second operation mode, the control device controls the number of revolutions of the compressor, including stopping, and
wherein in the state after the first operation mode is shifted to the second operation mode, the control device opens the first opening/closing valve at a timing to stop the compressor.

2. The vehicle air conditioning device according to claim 1, wherein the control device limits the number of times that the first opening/closing valve is opened at a timing to stop the compressor to a predetermined number of times.

3. The vehicle air conditioning device according to claim 1, comprising:
an auxiliary heating device to heat the air to be supplied from the air flow passage to the vehicle interior,
wherein the first operation mode includes any one, any combination or all of:
a heating mode to let the refrigerant discharged from the compressor radiate heat in the radiator, decompress the refrigerant from which the heat has been radiated, through the outdoor expansion valve, and then let the refrigerant absorb heat in the outdoor heat exchanger,
a dehumidifying and cooling mode to send the refrigerant discharged from the compressor through the radiator to the outdoor heat exchanger, let the refrigerant radiate heat in the radiator and the outdoor heat exchanger, decompress the refrigerant from which the heat has been radiated, and then let the refrigerant absorb heat in the heat absorber, and
a cooling mode to send the refrigerant discharged from the compressor through the radiator to the outdoor heat exchanger, let the refrigerant radiate heat in the outdoor heat exchanger, decompress the refrigerant from which the heat has been radiated, and then let the refrigerant absorb heat in the heat absorber, and
the second operation mode includes either one or all of:
a dehumidifying and heating mode to send the refrigerant discharged from the compressor through the bypass pipe to the outdoor heat exchanger, let the refrigerant radiate heat, decompress the refrigerant from which the heat has been radiated, let the refrigerant absorb heat in the heat absorber, and generate heat in the auxiliary heating device, and
a maximum cooling mode to send the refrigerant discharged from the compressor through the bypass pipe to the outdoor heat exchanger, let the refrigerant radiate heat, decompress the refrigerant from which the heat has been radiated, and then let the refrigerant absorb heat in the heat absorber.

4. The vehicle air conditioning device according to claim 3, wherein the first operation mode is the heating mode or the dehumidifying and cooling mode, and the second operation mode is the dehumidifying and heating mode.

5. The vehicle air conditioning device according to claim 2, comprising:
an auxiliary heating device to heat the air to be supplied from the air flow passage to the vehicle interior,
wherein the first operation mode includes any one, any combination or all of:
a heating mode to let the refrigerant discharged from the compressor radiate heat in the radiator, decompress the refrigerant from which the heat has been radiated, through the outdoor expansion valve, and then let the refrigerant absorb heat in the outdoor heat exchanger,
a dehumidifying and cooling mode to send the refrigerant discharged from the compressor through the radiator to the outdoor heat exchanger, let the refrigerant radiate heat in the radiator and the outdoor heat exchanger, decompress the refrigerant from which the heat has been radiated, and then let the refrigerant absorb heat in the heat absorber, and
a cooling mode to send the refrigerant discharged from the compressor through the radiator to the outdoor heat exchanger, let the refrigerant radiate heat in the outdoor heat exchanger, decompress the refrigerant from which the heat has been radiated, and then let the refrigerant absorb heat in the heat absorber, and
the second operation mode includes either one or all of:
a dehumidifying and heating mode to send the refrigerant discharged from the compressor through the bypass pipe to the outdoor heat exchanger, let the refrigerant radiate heat, decompress the refrigerant from which the heat has been radiated, let the refrigerant absorb heat in the heat absorber, and generate heat in the auxiliary heating device, and
a maximum cooling mode to send the refrigerant discharged from the compressor through the bypass pipe to the outdoor heat exchanger, let the refrigerant radiate heat, decompress the refrigerant from which the heat has been radiated, and then let the refrigerant absorb heat in the heat absorber.

6. The vehicle air conditioning device according to claim 5, wherein the first operation mode is the heating mode or the dehumidifying and cooling mode, and the second operation mode is the dehumidifying and heating mode.

* * * * *